Nov. 20, 1923.
M. E. ROE
1,474,493
JUVENILE VEHICLE
Filed Jan. 12, 1922   2 Sheets-Sheet 2
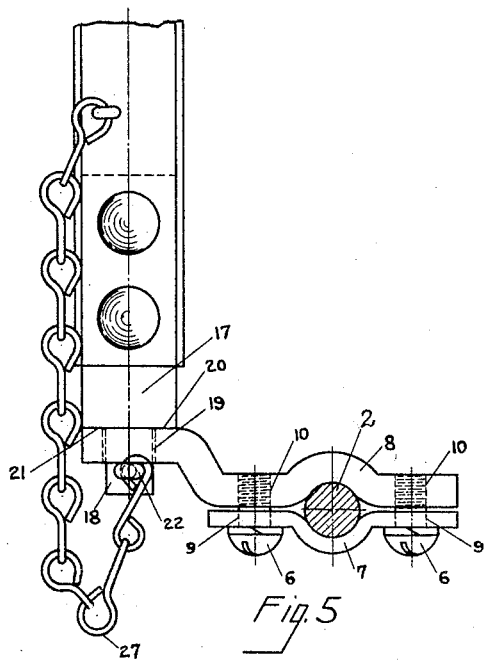
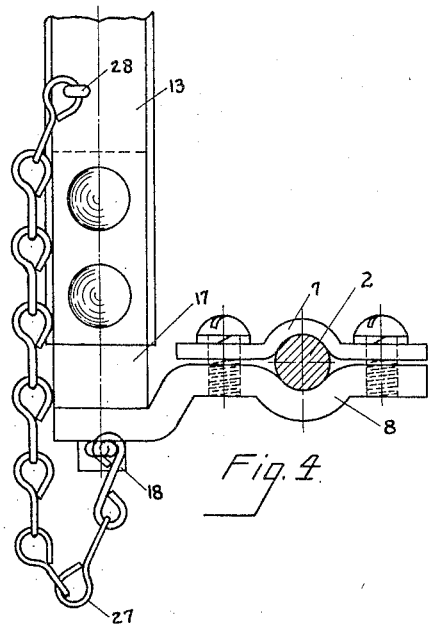
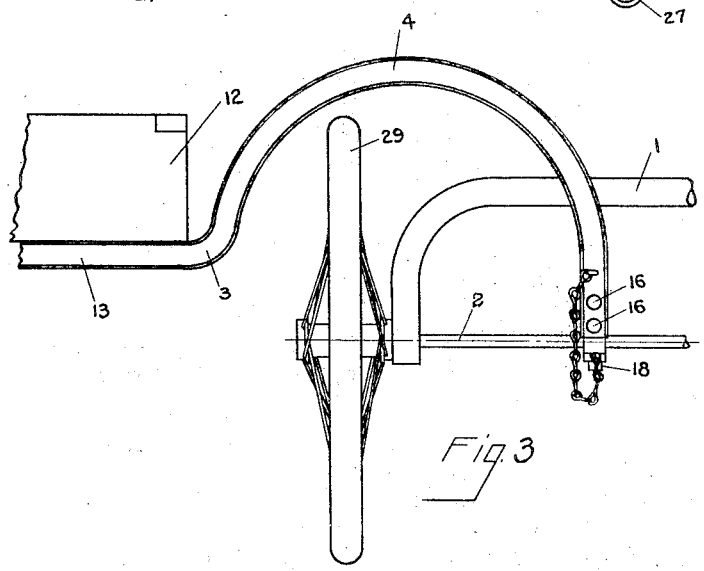
MAYO E. ROE   INVENTOR.
BY Richey Slough & Fales
His ATTORNEYS Patented Nov. 20, 1923.

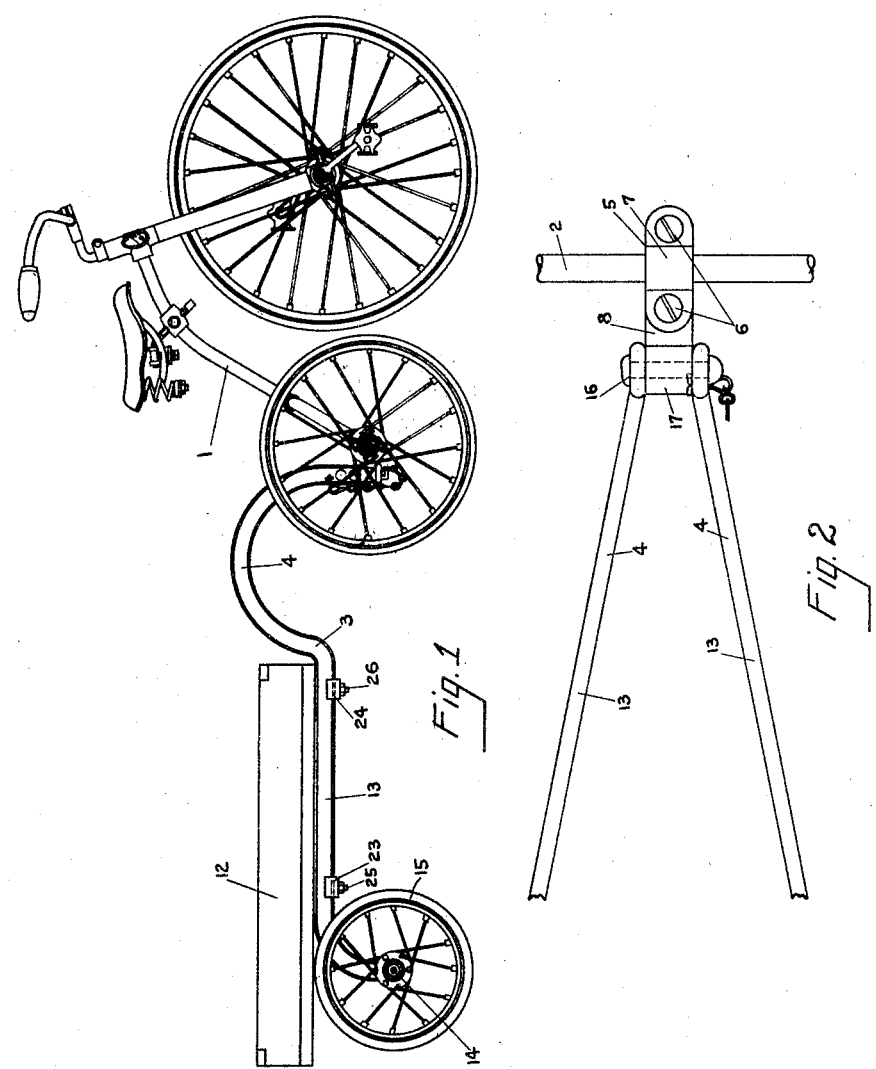

1,474,493

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

JUVENILE VEHICLE.

Application filed January 12, 1922. Serial No. 528,595.

*To all whom it may concern:*

Be it known that I, MAYO E. ROE, a citizen of the United States, residing at Elyria, in the county of Lorain and State of Ohio, have invented certain new and useful Improvements in Juvenile Vehicles, of which the following is a full, clear, and concise description, as will enable others skilled in the art to which my invention appertains to make and use the same.

My invention relates to juvenile vehicles and more particularly to a trailer attachment for a velocipede, cart, or wagon which is adapted to be secured to the rear part of such vehicle.

An object of my invention is to provide a trailer which will not interfere with the steering or movement of the velocipede or other vehicle, the shape of the trailer frame being arched in such a manner as to clear the rear wheels of the velocipede or other vehicle in any relative position of the trailer to such vehicle, such as when turning corners.

Another object of my invention is to provide a trailer attachment adapted to be easily and quickly detached from the velocipede or other vehicle. This is accomplished by a clamping arrangement adapted to be secured preferably to the rear axle of the vehicle such as a velocipede to which the trailer frame is attached, this arrangement being such that the trailer is readily detached from the velocipede; the clamp arrangement is preferably constructed to be connected to the trailer by means of a king pin held in position by a removable cotter pin having its head secured at the end of a chain attached to the trailer frame, so that such cotter pin cannot become lost when removed from king pin securing position.

Another object of my invention is to provide a trailer having a rigid frame and adapted to be clamped to the rear axle of the velocipede, the construction being such as to make the trailer and velocipede attain the utmost safety in operation as well as in ease of operation due to the fact that the trailer load in my improved construction is carried below the center of gravity of the velocipede itself thereby reducing the possibility of the trailer load causing the velocipede and rider to be over-turned, particularly when the velocipede is turning a corner creating a side pull on the velocipede.

Another object of my invention is to provide a novel clamping means adaptable to be secured in either one of two positions whereby the trailer frame is maintained parallel with the floor even when the velocipede is equipped with either one of two different sizes of rear wheels.

Another object of my invention is to provide such an improved design of juvenile vehicle as will be very strong and durable, but simple and inexpensive in construction, and which will at the same time be thoroughly practical and safe in operation, at the same time presenting a neat appearance to the eye.

Other objects of my invention and the invention itself will be better understood by reference to the drawings accompanying this specification, and constituting a portion thereof.

Referring to the drawings:

Fig. 1 shows a side elevational view of an embodiment of my invention illustrated as attached to the rear axle of a velocipede.

Fig. 2 shows a plan view of a portion of the structure of my invention, this view illustrating more particularly the attaching means.

Fig. 3 shows an end elevational view of part of the rear portion of a velocipide with the trailer attached thereto, but disposed at right angles to the velocipede as when turning a corner at right angles.

Fig. 4 shows the attaching means disposed with reference to the rear axle of the velocipede as when attached to a velocipede having a relatively large set of rear wheels.

Fig. 5 shows the attaching means disposed as when securing the trailer to a velocipede having smaller rear wheels.

Referring now to all of the figures of the drawings, and in which figures like parts are designated by like reference characters, at 1 is shown the frame of a child's velocipede to the rear axle, 2, to which is connected the frame, 3, having a forward gooseneck arched tongue portion, 4, the frame, 3, being secured to the axle, 2, by means of a clamping mechanism, 5, said clamping mechanism comprising clamping bolts, 6, and clamping clip, 7, and a connecting strip, 8, said connecting strip and said clip having cooperating curved velocipede-embracing portions operative when the bolts, 6, are passed through openings, 9, in the clip, 7, and screw threaded at 10 in the member 8 to securely clamp the member 8 to the rear axle 2 of the velocipede.

The trailer comprises a box body 12, a pair of frame members 13, said frame members carrying the rear axle 14 of the trailer, trailer wheels, 15, being journaled on the ends of the axle 14.

The frame members 13 are adapted to converge at their forward arched portion 4, where they are secured by bolts or rivets 16 to an intermediate member 17 which is perforated to admit the stem of the bolt 16. The member 17 has a reduced portion 18 which is adapted to pass through a perforation 19 in the member 8 of the attaching means, said perforation providing a journal whereby the reduced portion 18 may swivel or be rotated therein, the shoulder portion 20 of the member 17 resting upon the end upper surface 21 of the member 8. The reduced end 18 of the member 17 is perforated below the member 8 to admit a cotter pin 22 which prevents upward movement of the member 17 relative to the member 8, whereby the said members are removably secured together with swiveling connections.

The connection between the clamp comprising the members 7 and 8 and the axle 2 is such that the clamp can rotate on the axle to which it is frictionally secured; also the fit of the king pin 18 within the opening 19 of the member 8 is so loose as to permit a certain amount of up and down movement of the trailer without rotating the clamp on the axle 11. The two frame members 13 of the trailer are suitably secured together by cross frame members 23 and 24, bolts such as 25 and 26 being provided for the purpose of clamping the members 23 and 26 to the frame members and also to secure the box body 12 to the top of the said frame members, said bolts going through the bottom of the said box body.

A chain 27 secured at 28 to one of the frame members 13 is attached to the eye of the cotter pin 22 so that when this cotter pin is withdrawn, it will not be lost, but will depend with the chain from the frame 13.

By referring particularly to Fig. 3, it will be seen how the goose-neck frame member, 4, clears the top of the velocipede wheel tire 29 when the trailer is disposed at right angles to the velocipede as when turning a corner or turning around in a small space.

Although I show a box 12 secured to the top of the trailer frame, it is apparent that instead of a box such as the box 12, I may mount on the said frame a seat or other device practical to such a toy vehicle.

Referring now to Figs. 4 and 5, it will be seen how I may maintain the level of the frame member 13 where the rear wheels of the velocipede are of different sizes.

Therefore, when the rear wheels are of relatively large diameter, the member 8 will be inverted as illustrated in Fig. 4, the member 7 likewise being inverted, the two members changing positions; and when so assembled on the axle 2 of the velocipede, the end of the member 8 which carries the king pin 17 will take a position as illustrated in Fig. 4 below the level of the axle 11; also when the rear wheels of the velocipede are relatively of small diameter, the members 7 and 8 and bolts 6 will be assembled as shown in Fig. 5 so as to raise the level of the end portion of the member 8 supporting the king pin 18, and thereby the end of the tongue 4 of the trailer frame, in the position shown.

Although I have described but a single embodiment of my invention for the purpose of explaining same, I am aware that numerous and extensive departures may be made from the specific embodiment herein illustrated and described, but without departing from the spirit of my invention.

I claim:

1. In combination, a velocipede including a rear axle having wheels journalled at each end thereof, a trailer having an upwardly arched draft tongue extending forwardly therefrom, and a connecting member carried by said axle with which the forward end of said tongue is vertically pivoted, the arched portion of said tongue permitting the velocipede wheels to extend thereunder when the velocipede is disposed angularly relative to the trailer.

2. In combination, a velocipede including a rear axle having wheels journalled at each end thereof, a trailer having an upwardly arched draft tongue, the forward end of which extends downwardly and terminates in a king bolt, and a connecting member clamped to said axle with which the king bolt is vertically pivoted, the arched portion of said tongue permitting the velocipede wheels to extend thereunder when the velocipede is disposed angularly relative to the trailer.

3. In combination, a velocipede including a rear axle having wheels journalled thereon, a trailer including a draft tongue comprising a pair of forwardly converging upwardly curved members having a king bolt pivoted horizontally therebetween, and a bracket secured to said velocipede axle to which said king bolt is vertically swiveled, the arched draft tongue members permitting the wheels on said velocipede axle to extend thereunder when the velocipede is disposed angularly relative to said trailer.

4. In combination, a velocipede including a rear axle having wheels journalled thereon, a trailer including a forwardly projecting upwardly curved draft tongue, and means connecting said tongue with said axle to permit said tongue to move vertically relative to said axle and to permit said velocipede to move horizontally relative to said trailer.

5. In combination, a velocipede including a rear axle having wheels journalled thereon, a trailer including a draft tongue comprising a pair of forwardly converging upwardly curved members having a king bolt secured therebetween, a bracket secured to said velocipede axle to which said king bolt is vertically swiveled, the arched draft tongue member permitting the wheels on said velocipede axle to extend thereunder when the velocipede is disposed angularly relative to said trailer, and means for removably securing said king bolt in swivel position with said bracket.

In witness whereof I have hereunto signed my name this 5th day of January, 1922.

MAYO E. ROE.